US012749357B2

(12) United States Patent
Ahmad et al.

(10) Patent No.: US 12,749,357 B2
(45) Date of Patent: Sep. 29, 2026

(54) SYSTEMS AND METHODS FOR OUTPUTTING VEHICLE TIRE PRESSURE RELATED AUDIBLE MESSAGES

(71) Applicant: Ford Global Technologies, LLC, Dearborn, MI (US)

(72) Inventors: Syed Amaar Ahmad, Canton, MI (US); Lee Mitchell Tome, Windsor (CA); Bryan Michael Bolger, Canton, MI (US); John Eric Rollinger, Troy, MI (US); Jean de Dieu Mutangana, Detroit, MI (US)

( * ) Notice: Subject to any disclaimer, the term of this patent is extended or adjusted under 35 U.S.C. 154(b) by 208 days.

(21) Appl. No.: 18/410,335

(22) Filed: Jan. 11, 2024

(65) Prior Publication Data

US 2025/0232620 A1 Jul. 17, 2025

(51) Int. Cl.

*G07C 5/08* (2006.01)
*B60C 23/04* (2006.01)
*B60Q 5/00* (2006.01)

(52) U.S. Cl.

CPC ........ *G07C 5/0833* (2013.01); *B60C 23/0406* (2013.01); *B60C 23/0416* (2013.01); *B60Q 5/00* (2013.01)

(58) Field of Classification Search

CPC .............. G07C 5/0833; B60C 23/0406; B60C 23/0416; B60C 23/0401; B60Q 5/00
See application file for complete search history.

(56) References Cited

U.S. PATENT DOCUMENTS 7,053,761 B2 5/2006 Schofield et al.
8,823,505 B2 9/2014 Maekawa et al.
10,232,673 B1 * 3/2019 Lavoie ................ B60C 23/0479
11,673,434 B2 6/2023 Coburn et al.
2003/0065458 A1 * 4/2003 Fischer .............. B60C 23/0401 702/47

(Continued)

FOREIGN PATENT DOCUMENTS

DE 102011057100 A1 7/2013

OTHER PUBLICATIONS

Oricom International Pty Ltd , TPS10-8E Real Time Tyre Pressure Monitoring System Including 8 External Sensors, https://oricom.com.au/product/tps10-8e-real-time-tyre-pressure-monitoring-system-including-8-external-sensors/, 2020.

*Primary Examiner* — Peter D Nolan
*Assistant Examiner* — Demetra R Smith-Stewart
(74) *Attorney, Agent, or Firm* — Frank Lollo; Eversheds Sutherland (US) LLP

(57) ABSTRACT

A vehicle including a detection unit, an exterior speaker system and a processor is disclosed. The detection unit may be configured to detect a tire pressure of each vehicle tire and detect a user presence and a user location in proximity to the vehicle. The exterior speaker system may include a plurality of speakers configured to output audio signals. The processor may be configured to determine that a predefined condition, from a plurality of predefined conditions, may be met based on inputs obtained from the detection unit. The processor may further identify one or more speakers, from the plurality of speakers, to output an audible message based on a type of the predefined condition that may be met. The processor may further cause the speakers to output the audible message indicative of a tire pressure associated with one or more vehicle tires.

20 Claims, 4 Drawing Sheets

(56) References Cited

U.S. PATENT DOCUMENTS

2004/0065398 A1* 4/2004 Sapir ....................... B60C 17/00
152/519
2005/0160805 A1 7/2005 Taki
2011/0202229 A1* 8/2011 Owens ................ B60C 23/0406
701/31.4
2013/0282233 A1* 10/2013 Hsia .................... B60C 23/0457
701/36
2016/0159274 A1* 6/2016 Salter ...................... B60C 23/02
315/77
2018/0178601 A1* 6/2018 Surendra .............. G07C 5/0816
2019/0225034 A1* 7/2019 Van Wiemeersch .........................
B60C 23/0479
2019/0232733 A1* 8/2019 Patel ................... B60C 23/0461
2019/0255893 A1* 8/2019 Van Wiemeersch .........................
B60C 23/0479
2022/0161613 A1* 5/2022 Lin ..................... B60C 23/0494
2024/0217275 A1* 7/2024 Dudar ................. B60C 23/0484

* cited by examiner

SYSTEMS AND METHODS FOR OUTPUTTING VEHICLE TIRE PRESSURE RELATED AUDIBLE MESSAGES

FIELD

The present disclosure relates to systems and methods for outputting vehicle tire pressure related audible messages via exterior vehicle speakers or exciters.

BACKGROUND

Many users use pressure gauges to regularly check the tire pressure of each vehicle tire. In this manner, a user may find it difficult to measure and monitor the tire pressure if the user does not have a pressure gauge. Furthermore, when the user may be filling a tire with air, sometimes the monitor or the display that depicts the real-time tire pressure may not be readily available to the user.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
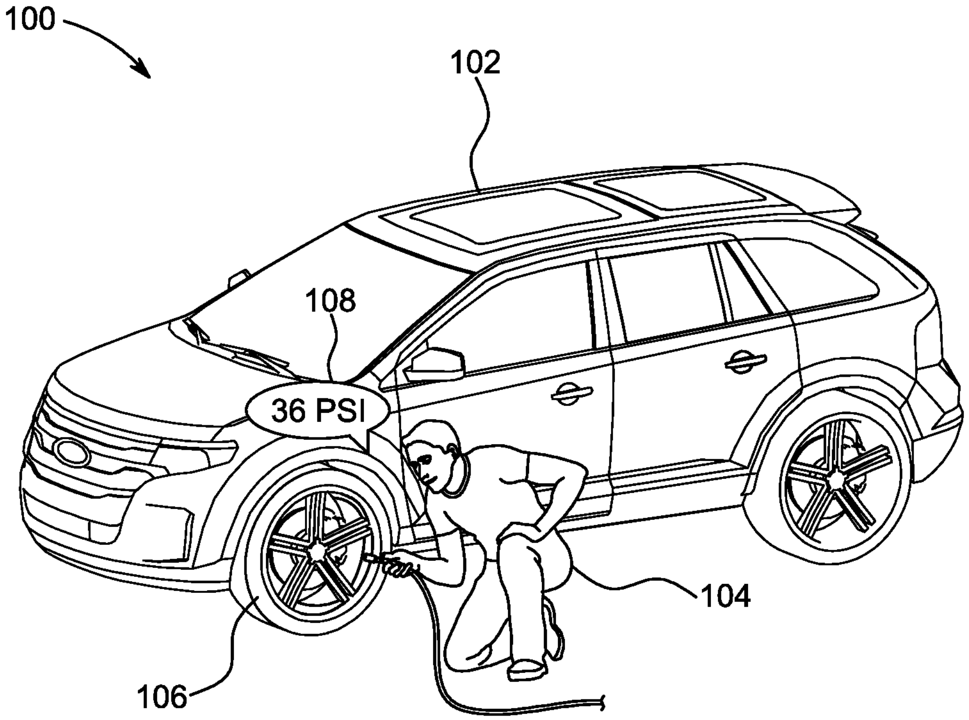
FIG. 1 depicts an environment in which techniques and structures for providing the systems and methods disclosed herein may be implemented.

The present disclosure describes a vehicle that may facilitate a user to conveniently know the tire pressures of one or more vehicle tires without having to use a pressure gauge. The vehicle may include an external speaker system including a plurality of speakers that may output audible messages indicative of vehicle tire pressures when the user may be in proximity to the vehicle, thus eliminating a need to use a pressure gauge to measure the tire pressure. In some aspects, the vehicle may include four tire pressure measurement systems (TPMSs), with one TPMS associated with each vehicle tire. The vehicle may use inputs obtained from the TPMSs to determine a real-time tire pressure of each vehicle tire and may use the external speaker system to output the real-time tire pressure for user's convenience.

In an exemplary aspect, when the user may be filling tire pressure/air in a vehicle tire, the vehicle may identify a speaker closest to the vehicle tire that may be getting filled and cause the identified speaker to output a real-time tire pressure. As an example, the speaker may output "36 psi," "38 psi," "40 psi," as the user inflates the vehicle tire. In this case, the user may regularly hear the audible messages and may not be required to use pressure gauge or view pressure readings on external displays to know about the real-time tire pressure. In some aspects, the vehicle may further cause the speaker to output an alert notification when the tire pressure increases greater than an upper tire pressure threshold, thereby preventing the user from over-inflating the vehicle tire. The vehicle may follow a similar (and opposite) process when the user may be deflating the vehicle tire.

In another exemplary aspect, when the user may be located in proximity to the vehicle or approaching the vehicle and tire pressure of one or more vehicle tires may be low (e.g., less than a predefined pressure threshold), the vehicle may cause all the exterior speakers to output an audible message including an identifier of the vehicle tire(s) that may have low pressure. For example, the speakers may output a message stating, "Front left tire has low pressure". Responsive to hearing such a message, the user may take remedial actions before driving the vehicle.

In yet another exemplary aspect, when the user may be located in proximity to the vehicle and inspecting the vehicle (e.g., by moving around the vehicle), the vehicle may determine a real-time user location based on inputs obtained from a vehicle's sensor suite. The vehicle may further determine a vehicle tire and a speaker closest to the real-time user location. The vehicle may cause the determined speaker to output an audible message including a tire pressure of the determined vehicle tire, thereby enabling the user to conveniently know about the tire pressure without using a pressure gauge. In some aspects, as the user moves around the vehicle, the vehicle may cause the exterior speakers to one-by-one output tire pressure of each vehicle tire, thereby facilitating the user in the vehicle inspection process.

The vehicle may be further configured to control the volume of the audible messages output from the speakers, such that the messages may be clearly audible to the user, but may not disturb other users who may be in the same area where the vehicle may be located. Further, the vehicle may ensure that the audible message volume is greater than an ambient noise level, so that the user may conveniently hear the messages.

The present disclosure discloses a vehicle that outputs audible messages indicative of vehicle tire pressures, thereby eliminating the need to use pressure gauges. Further, the vehicle outputs audible messages including real-time tire pressure when the user may be filling air in a vehicle tire, thereby reducing a probability of tire over-inflation. Furthermore, the vehicle outputs audible messages when the tire pressure in one or more vehicle tires may be low, thereby enabling the user to perform timely remedial actions.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a vehicle 102. The vehicle 102 may take the form of any passenger or commercial vehicle such as, for example, a car, a work vehicle, a crossover vehicle, a van, a minivan, etc. Further, the vehicle 102 may be a manually driven vehicle and/or may be configured to operate in a fully autonomous (e.g., driverless) mode or a partially autonomous mode and may include any powertrain such as, for example, a gasoline engine, one or more electrically-actuated motor(s), a hybrid system, etc.

The environment 100 may further include a user 104 who may be located in proximity to the vehicle 102. In the exemplary aspect depicted in FIG. 1, the user 104 is shown as filling-in tire pressure/air in a vehicle tire 106; however, the present disclosure is not limited to such an aspect. In other aspects (not shown), the user 104 may be approaching the vehicle 102, opening a vehicle door, inspecting the vehicle 102 by moving around a vehicle periphery, and/or performing any other operation in proximity to the vehicle 102.

The vehicle 102 may be configured to output audible messages related to vehicle tire pressure when the user 104 may be located in proximity to the vehicle 102 (and/or performing one or more operations described above). In one exemplary aspect, the audible messages may enable the user 104 to conveniently know about the real-time vehicle tire pressure when the user 104 may be filling air in the tire 106, thus considerably reducing a possibility of tire over-inflation or under-inflation. In another exemplary aspect, the audible messages may enable the user 104 to get timely alerts when a vehicle tire may be having low tire pressure (e.g., less than a predefined pressure threshold) and when the user 104 may be approaching the vehicle 102 and/or opening a vehicle door. In this case, the user 104 may get the corresponding vehicle tire checked and/or fill-in air in the vehicle tire, before driving the vehicle 102. In yet exemplary aspect, the audible messages may enable the user 104 to know about the tire pressure of each vehicle tire when the user 104 may be moving around and inspecting the vehicle 102. These exemplary aspects are described in detail in the description later below.

In some aspects, the vehicle 102 may include a detection unit (shown as detection unit 240 in FIG. 2) that may be configured to detect a user presence and a user location in proximity to the vehicle 102. Specifically, the detection unit may include a sensor suite (shown as sensor suite 244 in FIG. 2) that may localize the user location and/or a location of a user device associated with the user 104, when the user 104 may be located in proximity to the vehicle 102 (e.g., within a predefined distance of the vehicle periphery). In an exemplary aspect, the sensor suite may include, but is not limited to, a vehicle camera, a radio detection and ranging (radar) sensor, a light detection and ranging (lidar) sensor, an ultra-wideband (UWB) sensor, a Bluetooth low energy (BLE) sensor, and/or the like.

The detection unit may further include one or more tire pressure monitoring systems (or "TPMSs", shown as TPMSs 246 in FIG. 2) configured to detect a tire pressure of each vehicle tire. In an exemplary aspect, the detection unit may include four TPMSs, with one TPMS disposed in proximity to each vehicle tire. The vehicle 102 may further include an exterior speaker system that may include a plurality of speakers (or panel exciters). For example, the exterior speaker system may include a front left speaker disposed in proximity to a front left vehicle tire, a front right speaker disposed in proximity to a front right vehicle tire, a rear left speaker disposed in proximity to a rear left vehicle tire, and a rear right speaker disposed in proximity to a rear right vehicle tire. The vehicle 102 may be configured to control exterior speaker system operation based on inputs obtained from the detection unit and cause one or more speakers to output the audible messages indicative of vehicle tire pressure, as described below.

In a first exemplary aspect, when the vehicle 102 determines that the user 104 may be filling-in tire pressure in the tire 106 based on the inputs obtained from the detection unit, the vehicle 102 may determine a speaker (from the exterior speaker system) closest to the tire 106 that may be getting inflated and then cause the speaker to output an audible message including a real-time tire pressure. For example, the speaker may output "36 psi" (as shown by a caption 108 of FIG. 1) when the real-time tire pressure associated with the tire 106 may be 36 psi. As and when the real-time tire pressure increases (or decreases) by a predefined amount (e.g., 2 psi, as the user 104 fills the tire pressure), the speaker may output the corresponding real-time tire pressure, e.g., "38 psi", "40 psi", etc.

In some aspects, the vehicle 102 may further determine an optimal volume at which the speaker may output the audible message. When the user 104 may be filling in tire pressure in the tire 106, the optimal volume may be such that it is low enough that it does not cause inconvenience to other users who may be located in proximity to the vehicle 102 (and away from the tire 106), but may be higher than an ambient noise level (e.g., higher than the noise emanating from the compressor used to inflate the tire 106).

In a second exemplary aspect, when the vehicle 102 determines (based on the inputs obtained from the detection unit) that the user 104 may be approaching the vehicle 102 or located in proximity to the vehicle 102 and a tire pressure of one or more vehicle tires may be less than a predefined threshold, the vehicle 102 may cause all the speakers of the exterior speaker system to output an audible message including an identifier of the vehicle tire(s) having the less tire pressure. For example, in this case, the speakers may output, "Front left tire has low tire pressure". In this case, the speakers may output the message at a volume higher than the ambient noise level, so that the user 104 may conveniently hear the audible message and take remedial actions before driving the vehicle 102.

In a third exemplary aspect, when the vehicle 102 determines (based on the inputs obtained from the detection unit) that the user 104 may be moving around the vehicle periphery and inspecting the vehicle 102, the vehicle 102 may track the user's movement and identify a speaker and a vehicle tire closest to the user's real-time location as the user 104 moves. Responsive to identifying the speaker and the vehicle tire, the vehicle 102 may cause the speaker to output a tire pressure of the vehicle tire as the user 104 moves or is located in proximity to the vehicle tire. As an example, the front left speaker may output a tire pressure of the front left vehicle tire when the user 104 may be located in proximity to the front left vehicle tire, the front right speaker may output a tire pressure of the front right vehicle tire when the user 104 may be located in proximity to the front right vehicle tire and so on. In this manner, the user 104 may audibly hear the tire pressure of each vehicle tire as the user 104 moves around the vehicle 102 and may not require pressure gauges to measure tire pressures while inspecting the vehicle 102.

Further vehicle details are described below in conjunction with FIG. 2.

The vehicle 102 implements and/or performs operations, as described here in the present disclosure, in accordance with the owner manual and safety guidelines. In addition, any action taken by the user 104 based on recommendations or notifications provided by the vehicle 102 should comply with all the rules specific to the location and operation of the vehicle 102 (e.g., Federal, state, country, city, etc.). The recommendation or notifications, as provided by the vehicle

102, should be treated as suggestions and only followed according to any rules specific to the location and operation of the vehicle 102.

Figure 2:
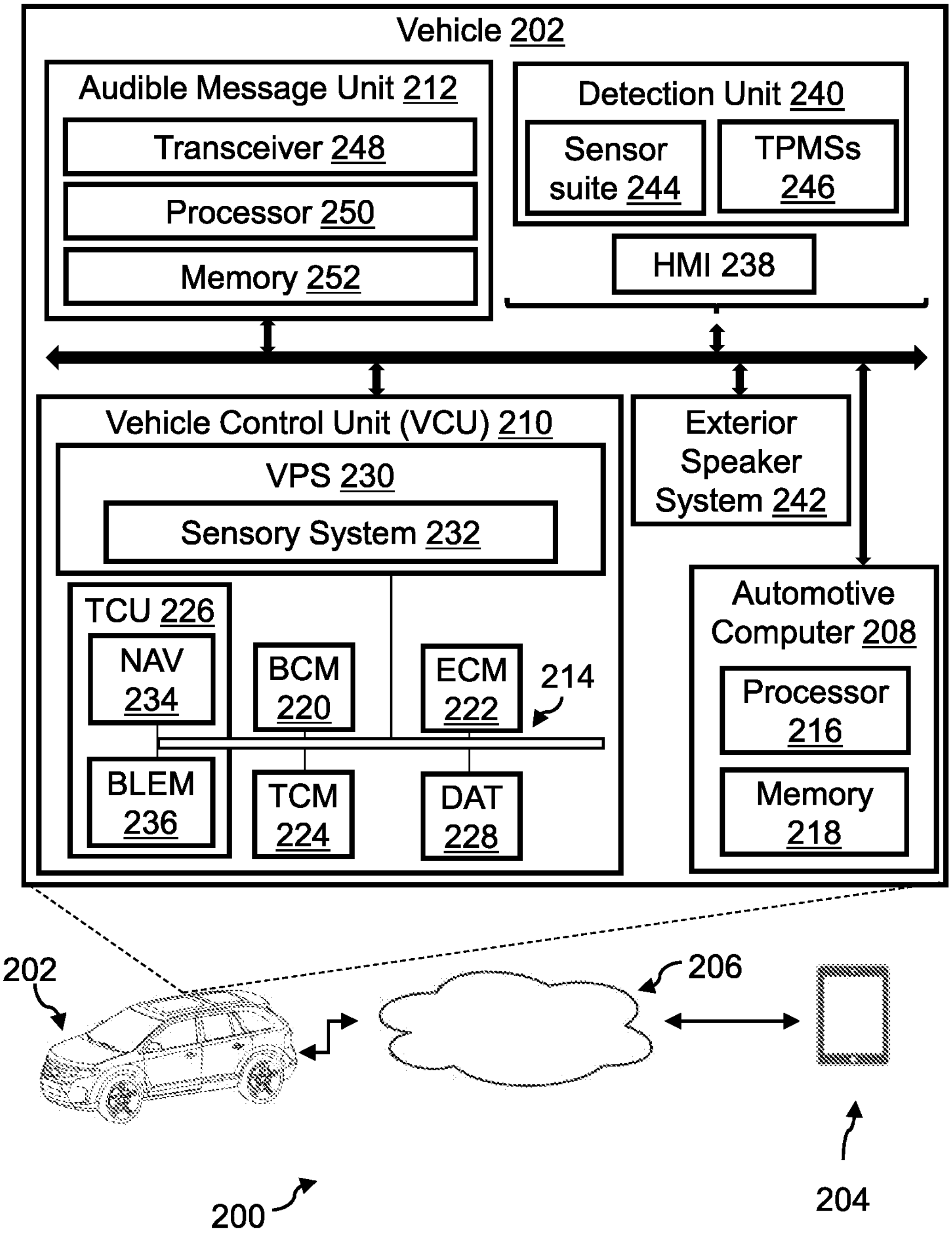
FIG. 2 depicts a block diagram of a system for outputting vehicle tire pressure related audible messages in accordance with the present disclosure.

FIG. 2 depicts a block diagram of a system 200 for outputting vehicle tire pressure related audible messages in accordance with the present disclosure. While describing FIG. 2, references will be made to FIG. 3.

The system 200 may include a vehicle 202 and a user device 204 communicatively coupled with each other via one or more networks 206 (or a network 206). The vehicle 202 may be same as the vehicle 102 described above in conjunction with FIG. 1. The user device 204 may be associated with the user 104 and may be, for example, a mobile phone, a laptop, a computer, a tablet, a wearable device, or any other similar device with communication capabilities.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 202 may include a plurality of units including, but not limited to, an automotive computer 208, a Vehicle Control Unit (VCU) 210, and an audible message unit 212 (or unit 212). The VCU 210 may include a plurality of Electronic Control Units (ECUs) 214 disposed in communication with the automotive computer 208.

In some aspects, the user device 204 may be configured to connect with the automotive computer 208 and/or the unit 212 via the network 206, which may communicate via one or more wireless connection(s), and/or may connect with the vehicle 202 directly by using near field communication (NFC) protocols, Bluetooth® protocols, Wi-Fi, Ultra-Wide Band (UWB), and other possible data connection and sharing techniques.

The automotive computer 208 and/or the unit 212 may be installed anywhere in the vehicle 202, in accordance with the disclosure. Further, the automotive computer 208 may operate as a functional part of the unit 212. The automotive computer 208 may be or include an electronic vehicle controller, having one or more processor(s) 216 and a memory 218. Moreover, the unit 212 may be separate from the automotive computer 208 (as shown in FIG. 2) or may be integrated as part of the automotive computer 208.

The processor(s) 216 may be disposed in communication with one or more memory devices disposed in communication with the respective computing systems (e.g., the memory 218 and/or one or more external databases not shown in FIG. 2). The processor(s) 216 may utilize the memory 218 to store programs in code and/or to store data for performing aspects in accordance with the disclosure. The memory 218 may be a non-transitory computer-readable storage medium or memory storing an audible message management program code. The memory 218 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In accordance with some aspects, the VCU 210 may share a power bus with the automotive computer 208 and may be configured and/or programmed to coordinate the data between vehicle systems, connected servers, and other vehicles (not shown in FIG. 2) operating as part of a vehicle fleet. The VCU 210 may include or communicate with any combination of the ECUs 214, such as, for example, a Body Control Module (BCM) 220, an Engine Control Module (ECM) 222, a Transmission Control Module (TCM) 224, a telematics control unit (TCU) 226, a Driver Assistances Technologies (DAT) controller 228, etc. The VCU 210 may further include and/or communicate with a Vehicle Perception System (VPS) 230, having connectivity with and/or control of one or more vehicle sensory system(s) 232. The vehicle sensory system 232 may include one or more vehicle sensors including, but not limited to, a Radio Detection and Ranging (RADAR or "radar") sensor configured for detection and localization of objects inside and outside the vehicle 102 using radio waves, sitting area buckle sensors, sitting area sensors, a Light Detecting and Ranging ("lidar") sensor, door sensors, proximity sensors, temperature sensors, wheel sensors, one or more ambient weather or temperature sensors, vehicle interior and exterior cameras, steering wheel sensors, a vehicle accelerometer, a vehicle gyroscope, a vehicle magnetometer, etc.

In some aspects, the VCU 210 may control vehicle operational aspects and implement one or more instruction sets received from the user device 204 and/or one or more connected servers, from one or more instruction sets stored in the memory 218, including instructions operational as part of the unit 212.

The TCU 226 may be configured and/or programmed to provide vehicle connectivity to wireless computing systems onboard and off board the vehicle 102 and may include a Navigation (NAV) receiver 234 for receiving and processing a GPS signal, a BLE® Module (BLEM) 236, a Wi-Fi transceiver, an ultra-wideband (UWB) transceiver, and/or other wireless transceivers (not shown in FIG. 2) that may be configurable for wireless communication (including cellular communication) between the vehicle 202 and other systems (e.g., a vehicle key fob, not shown in FIG. 2, the user device 204, etc.), computers, and modules. The TCU 226 may be disposed in communication with the ECUs 214 by way of a bus.

The ECUs 214 may control aspects of vehicle operation and communication using inputs from human drivers, inputs from the automotive computer 208, the unit 212, and/or via wireless signal inputs/command signals received via the wireless connection(s) from other connected devices, such as the user device 204, among others.

The BCM 220 generally includes integration of sensors, vehicle performance indicators, and variable reactors associated with vehicle systems and may include processor-based power distribution circuitry that may control functions associated with the vehicle body such as lights, windows, security, camera(s), audio system(s), speakers, wipers, door locks and access control, various comfort controls, etc. The BCM 220 may also operate as a gateway for bus and network interfaces to interact with remote ECUs (not shown in FIG. 2).

The DAT controller 228 may provide Level-1 through Level-3 automated driving and driver assistance functionality that may include, for example, active parking assistance, vehicle backup assistance, and/or adaptive cruise control, among other features. The DAT controller 228 may also provide aspects of user and environmental inputs usable for user authentication.

In some aspects, the automotive computer 208 may connect with an infotainment system or a vehicle Human-Machine Interface (HMI) 238. The HMI 238 may include a touchscreen interface portion and may include voice recognition features, biometric identification capabilities that may identify users based on facial recognition, voice recognition, fingerprint identification, or other biological identification means. In other aspects, the HMI 238 may be further configured to receive user instructions via the touchscreen interface portion and/or output or display notifications, navigation maps, etc. on the touchscreen interface portion.

The computing system architecture of the automotive computer 208, the VCU 210, and/or the unit 212 may omit certain computing modules. It should be readily understood that the computing environment depicted in FIG. 2 is an example of a possible implementation according to the present disclosure, and thus, it should not be considered as limiting or exclusive.

The vehicle 102 may further include a detection unit 240 and an exterior speaker system 242. The detection unit 240 may include a sensor suite 244 and one or more TPMSs 246. In some aspects, the sensor suite 244 may be part of the vehicle sensory system 232 and/or the TCU 226. In other aspects, the sensor suite 244 may be a separate unit, as shown in FIG. 2. The sensor suite 244 may be configured to detect a user presence and a user location in proximity to the vehicle 202. In an exemplary aspect, the sensor suite 244 may include a plurality of sensors including, but not limited to, one or more vehicle cameras, radar sensors, lidar sensors, UWB sensors, BLE sensors, radio access technology responders, and/or the like. In some aspects, the sensor suite 244 may detect the user presence and the user location in proximity to the vehicle 202 based on images, inputs, etc. captured by the vehicle cameras, radar sensors, lidar sensors, and/or the like. In other aspects, the sensor suite 244 may detect the user presence and the user location in proximity to the vehicle 202 by determining the presence of the user device 204 (that the user 104 may be carrying) in proximity to the vehicle 202 and localizing/determining the user device location by using, e.g., the UWB sensors, the BLE sensors, the radio access technology responders, and/or the like.

In some aspects, the vehicle 202 may include four TPMSs 246, with one TPMS being disposed in proximity to each vehicle tire. The TPMSs 246 may be configured to continuously (or at a predefined frequency) detect a tire pressure of each vehicle tire.

Figure 3:
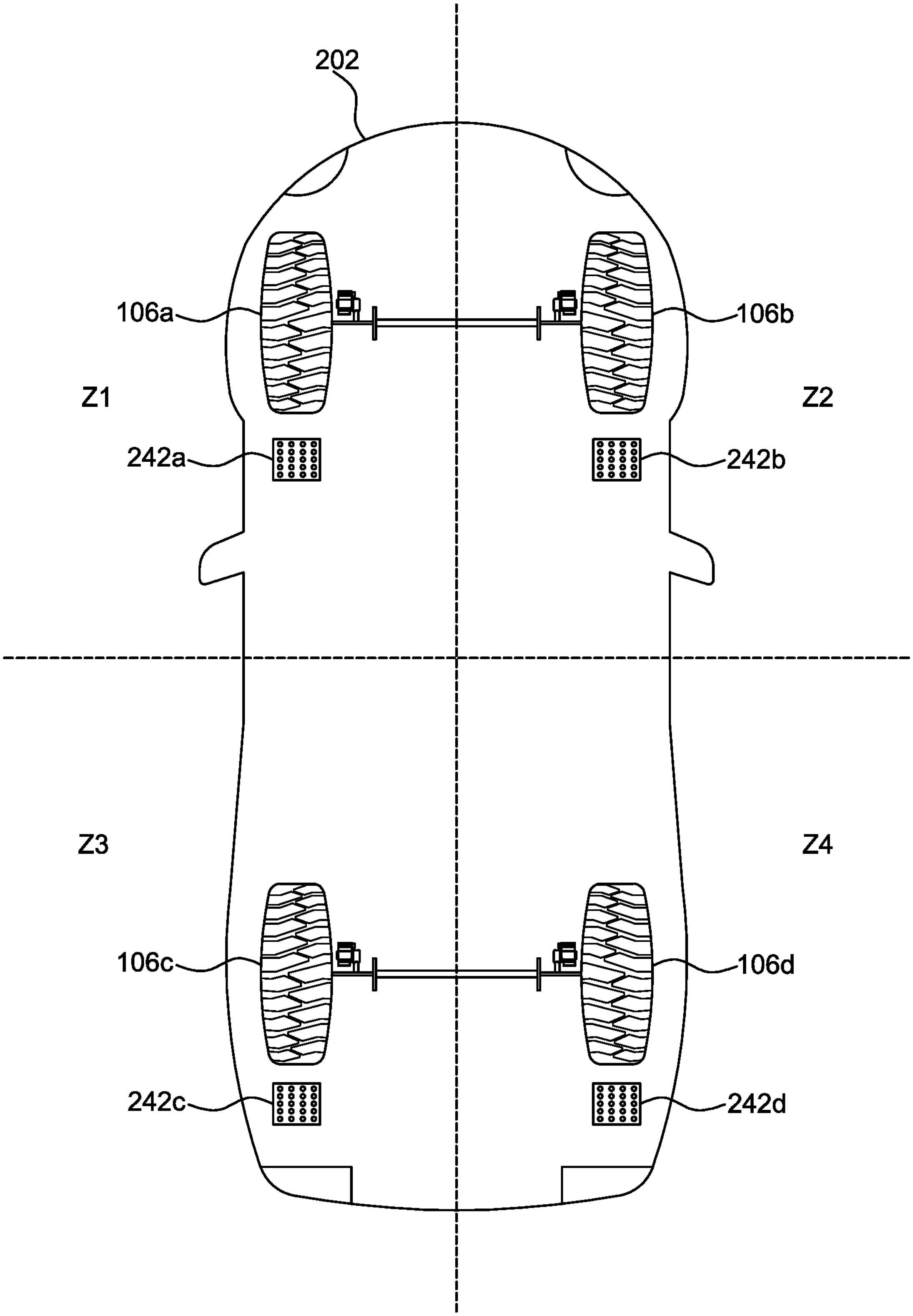
FIG. 3 depicts a top view of a vehicle in accordance with the present disclosure.

The exterior speaker system 242 may include a plurality of external speakers configured to output audio signals. For example, as shown in FIG. 3, the exterior speaker system 242 may include a front left speaker **242*a*, a front right speaker 242*b*, a rear left speaker 242*c*, and/or a rear right speaker 242*d*. In an exemplary aspect, the front left speaker 242*a* may be disposed in proximity to a front left vehicle tire 106*a*, the front right speaker 242*b* may be disposed in proximity to a front right vehicle tire 106*b*, the rear left speaker 242*c* may be disposed in proximity to a rear left vehicle tire 106*c*, and/or the rear right speaker 242*d* may be disposed in proximity to a rear right vehicle tire 106*d***.

In accordance with some aspects, the unit 212 may be integrated with and/or executed as part of the ECUs 214. The unit 212, regardless of whether it is integrated with the automotive computer 208 or the ECUs 214, or whether it operates as an independent computing system in the vehicle 102, may include a transceiver 248, a processor 250, and a computer-readable memory 252.

The transceiver 248 may be configured to receive information/inputs from one or more external devices or systems, e.g., the user device 204, one or more connected servers, and/or the like, via the network 206. Further, the transceiver 248 may transmit notifications, requests, signals, etc. to the external devices or systems. In addition, the transceiver 248 may be configured to receive information/inputs from vehicle components such as the detection unit 240, the vehicle sensory system 232, one or more ECUs 214, and/or the like. Further, the transceiver 248 may transmit signals (e.g., command signals) or notifications to the vehicle components such as the BCM 220, the HMI 238, the exterior speaker system 242, and/or the like.

The processor 250 and the memory 252 may be same as or similar to the processor 216 and the memory 218, respectively. In some aspects, the processor 250 may utilize the memory 252 to store programs in code and/or to store data for performing aspects in accordance with the disclosure. The memory 252 may be a non-transitory computer-readable storage medium or memory storing the audible message management program code. In some aspects, the memory 252 may additionally store a three-dimensional (3D) map or geometry associated with the vehicle 202, including location coordinates of one or more vehicle components, vehicle dimensions, and/or the like.

In operation, the processor 250 may obtain inputs from the detection unit 240 continuously or at a predefined frequency. Specifically, the processor 250 may obtain inputs from the sensor suite 244 and each TPMS 246 continuously or at a predefined frequency. Responsive to obtaining the inputs from the detection unit 240, the processor 250 may determine if a predefined condition, from a plurality of predefined conditions, may be met based on the obtained inputs. In an exemplary aspect, the plurality of predefined conditions may include, but is not limited to, a rate of change of tire pressure associated with at least one vehicle tire being greater than a predefined rate threshold (as determined via the inputs obtained from the TPMSs 246), a tire pressure associated with at least one vehicle tire being less than a predefined tire pressure threshold (as determined via the inputs obtained from the TPMSs 246) and a user presence being detected in proximity to the vehicle 202 (as determined via the inputs obtained from the sensor suite 244), a user presence being detected in proximity to the vehicle 202 and a rate of change of user location being greater than a predefined location threshold (as determined via the inputs obtained from the sensor suite 244), and/or the like.

Responsive to determining that a predefined condition, from the plurality of predefined conditions, may be met based on the obtained inputs, the processor 250 may determine a type of the predefined condition that may be met based on the inputs obtained from the detection unit 240. In some aspects, the processor 250 may determine that a first type of predefined condition may be met when the rate of change of tire pressure associated with at least one vehicle tire (from the four vehicle tires **106*a-d*) may be greater than the predefined rate threshold. As an example, when the user 104 may be filling-in tire pressure in the front left vehicle tire 106*a*, the rate of change of tire pressure associated with the front left vehicle tire 106*a* may be greater than the predefined rate threshold (e.g., in range of 0.4 to 0.8 psi per second). In such an instance, the processor 250 may determine that the first type of predefined condition may be met. In some aspects, the predefined rate threshold may be tunable and may increase or decrease after the processor 250** determines that the first type of predefined condition may be met for at least one vehicle tire.

In further aspects, the processor 250 may determine that a second type of predefined condition may be met when a tire pressure associated with at least one vehicle tire may be less than a predefined tire pressure threshold and the user presence may be detected in proximity to the vehicle 202. As an example, when the user 104 may be approaching the vehicle 202 and/or opening a vehicle door, and the processor 250 determines that one or more vehicle tires (from the four vehicle tires 106*a-d*) may have low tire pressure (i.e., less than the predefined tire pressure threshold), the processor 250 may determine that the second type of predefined condition may be met.

In yet another aspect, the processor 250 may determine that a third type of predefined condition may be met when the user presence may be detected in proximity to the vehicle 202 and the rate of change of user location may be greater than the predefined location threshold. As an example, when the user 104 may be moving around the vehicle periphery and inspecting the vehicle 202, the processor 250 may determine that the third type of predefined condition may be met.

The example predefined conditions described above should not be construed as limiting, and the processor 250 may determine other types of predefined conditions without departing from the present disclosure scope.

Responsive to determining the type of predefined condition that may be met, the processor 250 may identify one or more speakers, from the plurality of speakers associated with the external speaker system 242, to output an audible message based on the type of predefined condition that may be met. The processor 250 may then cause the identified speaker(s) to output an audible message indicative of a tire pressure associated with one or more vehicle tires (from the vehicle tires 106*a-d*), as described below.

In a first exemplary aspect, when the processor 250 determines that the first type of predefined condition may be met (e.g., when the user 104 may be filling tire pressure in the front left vehicle tire 106*a*), the processor 250 may identify a speaker, from the speakers 242*a-d*, that may be closest to the front left vehicle tire 106*a*. For example, in this case, the processor 250 may identify that the front left speaker 242*a* may be closest to the front left vehicle tire 106*a*. Responsive to identifying that the front left speaker 242*a* may be closest to the front left vehicle tire 106*a*, the processor 250 may determine a real-time time pressure of the front left vehicle tire 106*a* (based on the inputs obtained from the associated TPMS 246) and cause the front left speaker 242*a* to output an audible message including the real-time time pressure. For example, the audible message may output “36 psi” (as shown in FIG. 1). Further, as and when the real-time time pressure increases by a predefined increment amount (e.g., by 2 psi), the processor 250 may cause the front left speaker 242*a* to output another audible message including the real-time time pressure (e.g., “38 psi,” “40 psi,” and so on).

In some aspects, the processor 250 may further determine an optimal volume associated with the first type of predefined condition at which the front left speaker 242*a* may output the audible message and then cause the front left speaker 242*a* to output the audible message at the optimal volume. As an example, when the processor 250 determines that the first type of predefined condition may be met, the processor 250 may determine the optimal volume such that only the user 104 located in proximity to the front left speaker 242*a* may hear the audible message, and other users who may be located in the same area as the vehicle 202 are not disturbed. Stated another way, in this case, the optimal volume may be less than a predefined volume threshold so that the audible message may have a low volume.

In some aspects, the detection unit 240 may further include a microphone (not shown) that may be configured to capture an ambient noise in proximity to the vehicle 202. The processor 250 may obtain the inputs from the microphone and determine an ambient noise level based on the obtained inputs. The processor 250 may further determine the optimal volume to output the audible message such that the volume may be greater than the ambient noise level. As an example, when the user 104 may be filling tire pressure in the front left vehicle tire 106*a*, the processor 250 may determine the optimal volume such that it may be greater than the sound being emitted from the compressor providing the pressure to the front left vehicle tire 106*a*. This may enable the user 104 to conveniently hear the audible message including the real-time vehicle tire pressure.

In further aspects, the processor 250 may determine that the real-time vehicle tire pressure associated with the front left vehicle tire 106*a* may be greater than a predefined upper tire pressure threshold (e.g., when the user 104 may be filling tire pressure in the front left vehicle tire 106*a*). Responsive to such determination, the processor 250 may cause the front left speaker 242*a* to output an alert notification, thereby preventing the user 104 from over-inflating the front left vehicle tire 106*a*.

A similar (and opposite) process may be followed when the user 104 may be reducing or deflating tire pressure in one or more vehicle tires. In this case, the processor 250 may cause the front left speaker 242*a*/external speaker system 242 to output audible messages as the tire pressure decreases from a higher value to a lower value.

Furthermore, the processor 250 may disable the front left speaker 242*a* to output any further audible message, when the processor 250 determines that the rate of change of tire pressure associated with the front left vehicle tire 106*a* may have decreased below a predefined low rate threshold.

In a second exemplary aspect, when the processor 250 determines that the second type of predefined condition may be met (e.g., when the tire pressure associated with at least one vehicle tire may be less than the predefined tire pressure threshold and the user presence may be detected in proximity to the vehicle 202), the processor 250 may determine an identifier of the vehicle tire that may have its tire pressure less than predefined tire pressure threshold. For example, when the front left vehicle tire 106*a* may have its tire pressure less than the predefined tire pressure threshold, the processor 250 may determine the identifier as “front left vehicle tire”. Responsive to identifying the tire identifier, the processor 250 may cause all the speakers associated with the external speaker system 242 to output an audible message including the tire identifier. For example, in this case, the processor 250 may cause the front left speaker 242*a*, the front right speaker 242*b*, the rear left speaker 242*c*, and/or the rear right speaker 242*d* to output an audible message stating, e.g., “the front left vehicle tire has low tire pressure”. Responsive to hearing such a message, the user 104 may take remedial actions before driving the vehicle 202. In this case, the audible message may be output from the speakers, as described above, to ensure that the user 104 clearly hears the message and takes timely remedial actions.

In this case as well, the processor 250 may determine the ambient noise level based on the inputs obtained from the microphone/detection unit 240 and then determine an optimal volume to output the audible message based on the ambient noise level. Specifically, in this case, the processor 250 may cause the front left speaker 242*a*, the front right speaker 242*b*, the rear left speaker 242*c*, and/or the rear right speaker 242*d* to output the audible message at a volume that may be greater than the ambient noise level (thereby facilitating the user 104 to conveniently hear the audible message).

In a third exemplary aspect, when the processor 250 determines that the third type of predefined condition may be met (e.g., when the user presence may be detected in proximity to the vehicle 202 and the rate of change of user location may be greater than the predefined location threshold), the processor 250 may determine a real-time user location in proximity to the vehicle 202 based on the inputs obtained from the sensor suite 244. Responsive to determining the real-time user location, the processor 250 may determine a "zone" in proximity to the vehicle 202 where the user 104 may be located, based on the real-time user location and the 3D map or geometry associated with the vehicle 202 (that may be stored in the memory 252). For example, the processor 250 may determine whether the user 104 may be located in zone "Z1", "Z2", "Z3" or "Z4" (as shown in FIG. 3) based on the real-time user location and the 3D vehicle map or geometry.

Responsive to determining the real-time user location or the zone as described above, the processor 250 may determine a vehicle tire closest to the real-time user location or in the zone. For example, when the user 104 may be located in the zone "Z1", the processor 250 may determine that the front left vehicle tire 106*a* may be closest to the real-time user location. Responsive to determining that the front left vehicle tire 106*a* may be closest to the real-time user location, the processor 250 may determine a tire pressure associated with the front left vehicle tire 106*a* based on the inputs obtained from the associated TPMS 246. The processor 250 may further determine a speaker (e.g., the front left speaker 242*a*) that may be closest to the front left vehicle tire 106*a* or in the zone "Z1". The processor 250 may further cause the front left speaker 242*a* to output an audible message including the tire pressure associated with the front left vehicle tire 106*a*. For example, the front left speaker 242*a* may output an audible message stating, "The front left vehicle tire has a pressure of 36 psi".

As and when the user 104 moves around the vehicle 202 (thereby changing the "zones" in which the user 104 may be located), the processor 250 may cause the speakers 242*a-d* to one-by-one output the tire pressures of the vehicle tires that may closest to the real-time user location. In this manner, during vehicle inspection, the user 104 may conveniently know about the tire pressure of each vehicle tire, without having to use a pressure gauge.

In some aspects, if the user 104 may be standing/located in between two zones, the processor 250 may either cause the external speaker system 242 not to output any tire pressure, or may cause the external speaker system 242 to output tire pressures for vehicle tires associated with both the zones in which the user 104 may be standing.

In further aspects, if the user 104 may be moving back and forth between two or more zones, the processor 250 may cause the speaker of that zone to output the audible message where the user 104 spends the most time duration or a time duration above a predefined time duration threshold. Furthermore, if multiple zones have multiple users present or there are spurious locations due to non-human objects or obstructions, then the processor 250 may cause the speaker to output only the pressure of the most reliably detected zone.

Although the description above describes an aspect where the external speaker system 242 outputs audible messages indicative of tire pressures, in additional aspects, one or more visual indicators (e.g., light-based indicators) may also be used to indicate tire pressures. Furthermore, in some aspects, audio prompts and chimes may be used to indicate tire pressures.

Figure 4:
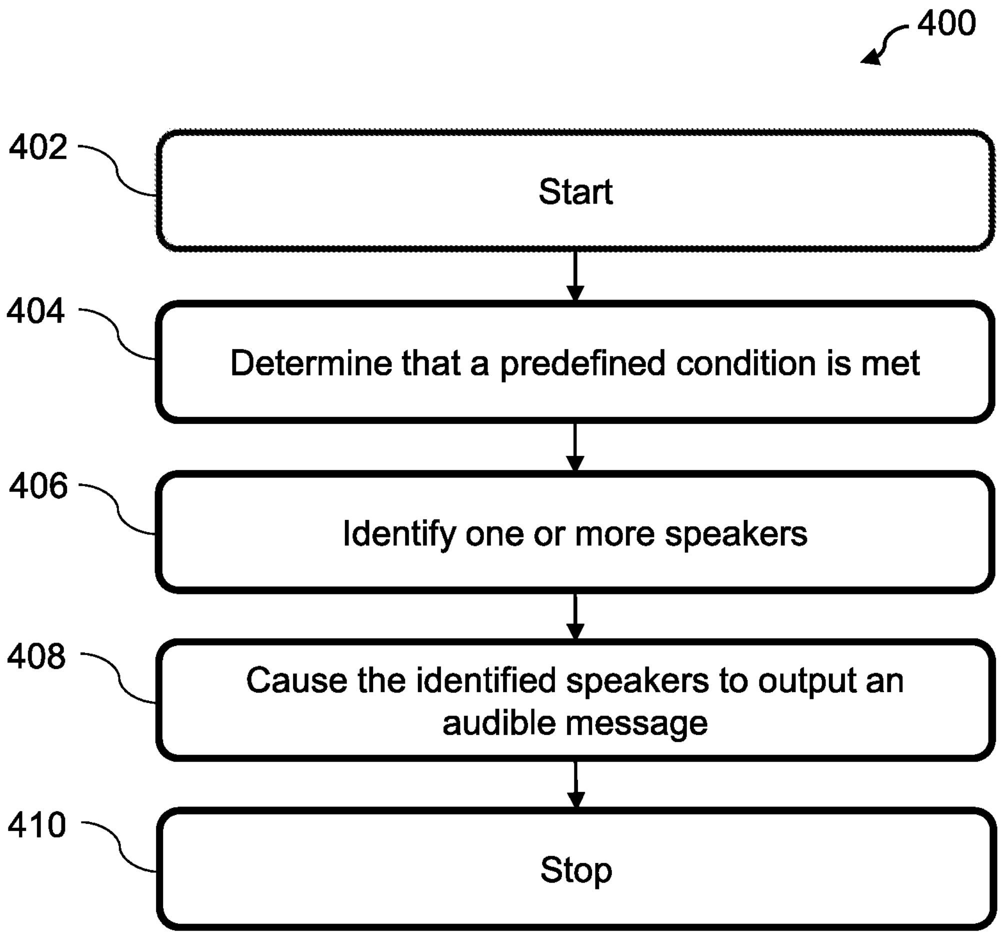
FIG. 4 depicts a flow diagram of a method for outputting vehicle tire pressure related audible messages in accordance with the present disclosure.

FIG. 4 depicts a flow diagram of a method 400 for outputting vehicle tire pressure related audible messages in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include determining, by the processor 250, that a predefined condition, from a plurality of predefined conditions, may be met based on the inputs obtained from the detection unit 240. At step 406, the method may include identifying, by the processor 250, one or more speakers, from the plurality of speakers associated with the exterior speaker system 242, to output an audible message based on a type of the predefined condition that may be met.

At step 408, the method 400 may include causing, by the processor 250, the identified speaker(s) to output the audible message indicative of a tire pressure associated with one or more vehicle tires.

The method 400 may end at step 410.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle comprising:

a detection unit configured to:
 detect a tire pressure of each vehicle tire; and
 detect a user presence and a user location in proximity to the vehicle;

an exterior speaker system comprising a plurality of speakers configured to output audio signals, wherein the plurality of speakers includes a front left speaker disposed in proximity to a front left vehicle tire, a front right speaker disposed in proximity to a front right vehicle tire, a rear left speaker disposed in proximity to a rear left vehicle tire, and a rear right speaker disposed in proximity to a rear right vehicle tire; and a processor communicatively coupled with the detection unit and the exterior speaker system, wherein the processor is configured to:
 determine that a predefined condition, from a plurality of predefined conditions, is met based on inputs obtained from the detection unit;
 identify one or more speakers, from the plurality of speakers, to output an audible message based on a type of the predefined condition that is met; and
 cause the one or more speakers to output the audible message, wherein the audible message is indicative of the tire pressure associated with one or more vehicle tires.

2. The vehicle of claim 1, wherein the detection unit comprises one or more tire pressure monitoring systems (TPMSs).

3. The vehicle of claim 1, wherein the detection unit comprises a sensor suite comprising at least one of a vehicle camera, a radio detection and ranging (radar) sensor, a light detection and ranging (lidar) sensor, an ultra-wideband (UWB) sensor and a Bluetooth low energy (BLE) sensor.

4. The vehicle of claim 3, wherein the sensor suite determines the user presence and the user location in proximity to the vehicle by determining a presence of a user device and a user device location in proximity to the vehicle.

5. The vehicle of claim 1, wherein the processor determines that a first type of the predefined condition is met when a rate of change of tire pressure associated with at least one vehicle tire is greater than a predefined rate threshold, and wherein the at least one vehicle tire is one of the front left vehicle tire, the front right vehicle tire, the rear left vehicle tire, or the rear right vehicle tire.

6. The vehicle of claim 5, wherein the processor is further configured to:

determine a speaker closest to the at least one vehicle tire from the plurality of speakers, responsive to determining that the first type of the predefined condition is met;

determine a real-time tire pressure of the at least one vehicle tire;

determine an optimal volume associated with the first type of the predefined condition to output the audible message; and cause the speaker to output the audible message comprising the real-time tire pressure at the optimal volume.

7. The vehicle of claim 6, wherein the optimal volume is less than a predefined volume threshold when the first type of the predefined condition is met.

8. The vehicle of claim 6, wherein the detection unit further comprises a microprocessor, wherein the processor is further configured to determine an ambient noise level based on inputs obtained from the microprocessor, and wherein the optimal volume is based on the ambient noise level.

9. The vehicle of claim 6, wherein the processor is further configured to cause the speaker to output an alert notification when the real-time tire pressure exceeds a predefined upper tire threshold.

10. The vehicle of claim 1, wherein the processor determines that a second type of the predefined condition is met when the tire pressure associated with at least one vehicle tire is less than a predefined tire pressure threshold and the user presence is detected in proximity to the vehicle, and wherein the at least one vehicle tire is one of the front left vehicle tire, the front right vehicle tire, the rear left vehicle tire, or the rear right vehicle tire.

11. The vehicle of claim 10, wherein the processor is further configured to:

determine an identifier of the at least one vehicle tire; and cause the front left speaker, the front right speaker, the rear left speaker and the rear right speaker to output the audible message comprising the identifier.

12. The vehicle of claim 11, wherein the processor is further configured to:

determine an optimal volume to output the audible message, wherein the optimal volume is based on an ambient noise level; and cause the front left speaker, the front right speaker, the rear left speaker and the rear right speaker to output the audible message at the optimal volume.

13. The vehicle of claim 1, wherein the processor determines that a third type of the predefined condition is met when the user presence is detected in proximity to the vehicle and a rate of change of user location is greater than a predefined location threshold.

14. The vehicle of claim 13, wherein the processor is further configured to:

determine a real-time user location based on the inputs;

determine a vehicle tire closest to the real-time user location from the front left vehicle tire, the front right vehicle tire, the rear left vehicle tire, and/or the rear right vehicle tire;

determine a real-time tire pressure of the vehicle tire based on the inputs;

determine a speaker closest to the vehicle tire from the front left speaker, the front right speaker, the rear left speaker and the rear right speaker; and cause the speaker to output the audible message comprising the real-time tire pressure.

15. The vehicle of claim 1, wherein the audible message output by the one or more speakers is indicative of a tire pressure associated with a vehicle tire corresponding to the one or more speakers.

16. A method to output an audible message, the method comprising:

determining, by a processor, that a predefined condition, from a plurality of predefined conditions, is met based on inputs obtained from a detection unit, wherein the detection unit is configured to:

detect a tire pressure of each vehicle tire; and detect a user presence and a user location in proximity to a vehicle;

identifying, by the processor, one or more speakers, from a plurality of speakers of an exterior speaker system configured to output audio signals, to output the audible message based on a type of the predefined condition that is met, wherein the plurality of speakers includes a front left speaker disposed in proximity to a front left vehicle tire, a front right speaker disposed in proximity to a front right vehicle tire, a rear left speaker disposed in proximity to a rear left vehicle tire, and a rear right speaker disposed in proximity to a rear right vehicle tire; and causing, by the processor, the one or more speakers to output the audible message, wherein the audible message is indicative of a tire pressure associated with one or more vehicle tires.

17. The method of claim 16, wherein the detection unit comprises one or more tire pressure monitoring systems (TPMSs).

18. The method of claim 16, wherein the detection unit comprises a sensor suite comprising at least one of a vehicle camera, a radio detection and ranging (radar) sensor, a light detection and ranging (lidar) sensor, a ultra-wideband (UWB) sensor and a Bluetooth low energy (BLE) sensor.

19. The method of claim 16, wherein the processor is configured to cause the audible message to be output by a speaker disposed in proximity to a vehicle tire for which the tire pressure is detected.

20. A non-transitory computer-readable storage medium having instructions stored thereupon which, when executed by a processor, cause the processor to:

determine that a predefined condition, from a plurality of predefined conditions, is met based on inputs obtained from a detection unit, wherein the detection unit is configured to:

detect a tire pressure of each vehicle tire; and detect a user presence and a user location in proximity to a vehicle;

identify one or more speakers, from a plurality of speakers of an exterior speaker system configured to output audio signals, to output an audible message based on a type of the predefined condition that is met, wherein the plurality of speakers includes a front left speaker disposed in proximity to a front left vehicle tire, a front right speaker disposed in proximity to a front right vehicle tire, a rear left speaker disposed in proximity to a rear left vehicle tire, and a rear right speaker disposed in proximity to a rear right vehicle tire; and cause the one or more speakers to output the audible message, wherein the audible message is indicative of a tire pressure associated with one or more vehicle tires.

* * * * *